United States Patent [19]

Hegedusch

[11] Patent Number: 4,923,340

[45] Date of Patent: May 8, 1990

[54] DOWELING JIG

[76] Inventor: Joseph Hegedusch, Rte. 1, Box 318, Luray, Va. 22835

[21] Appl. No.: 232,676

[22] Filed: Aug. 16, 1988

[51] Int. Cl.⁵ .............................................. B23B 49/00
[52] U.S. Cl. .................................. 408/72 R; 408/16; 408/115 R
[58] Field of Search ................... 408/72 R, 72 B, 108, 408/115 R, 115 B, 103, 16, 241 B

[56]  References Cited

U.S. PATENT DOCUMENTS

| | | | |
|---|---|---|---|
| 2,381,943 | 8/1945 | Williams | 408/115 |
| 2,602,238 | 7/1952 | Wellman | 408/241 G |
| 2,651,951 | 9/1953 | Altenburger | 408/97 |
| 2,725,639 | 6/1953 | Yungman | 408/72 |
| 2,783,665 | 3/1957 | Saunders | 408/108 |
| 2,810,310 | 10/1957 | Saunders | 408/115 |
| 2,915,926 | 12/1959 | Woerner | 408/115 |
| 2,934,979 | 5/1960 | Hartje | 408/103 |
| 4,093,394 | 6/1978 | Adams | 408/72 B X |
| 4,194,861 | 3/1980 | Keller | 408/241 B X |
| 4,443,138 | 4/1984 | Butera | 408/115 R |

OTHER PUBLICATIONS

"Dowel-It Self Centerings Jigs", The Woodworkers' Store, 1988 catalog.
Record Doweling Jig Does It All, The Woodworkers' Store, 1988 catalog.
Dowel Crafter Doweling Jig, Constantine, 1988 catalog; p. 42.
Doweling Jig, Constantine 1988 catalog, p. 37.
Dowl-It Doweling Jig Constantine 1988 catalog, p. 42.
Doweling Master, Constantine 1988 catalog, p. 42.
Wolfcraft Meister-Dubler, Robert Wolff GmbH & Co., KB W. Germany.

Primary Examiner—Steven C. Bishop
Attorney, Agent, or Firm—Dickstein, Shapiro & Morin

[57] ABSTRACT

A dowel jig has two clamp rails of equal length pivotally attached to two cross-bars of equal length so form a series of parallelograms when the cross-bars are pivoted. A bushing holder bar attached to the center of each cross-bar, contains several drill bushings equally spaced apart from one another. Thus, when the rails are clamped to the sides of a workpiece the drill bushings are automatically centered upon the top of the workpiece. Further, the rails are located substantially below the bottom surface of the bushing holder bar and thus guidelines on the bushing holder bar and location marks on the workpiece are visible by the user for alignment.

16 Claims, 2 Drawing Sheets

DOWELING JIG

BACKGROUND OF THE INVENTION

The present invention relates generally to woodworking tools and more particularly to a doweling jig. A common way to join together two pieces of wood is to drill two holes, one hole in each of the facing surfaces of the two pieces of wood, and to glue a length of a wooden rod, called a dowel, into both holes with the surfaces of the wood contacting one another. This technique is called doweling. For example, doweling is widely used for joining together the various wood parts of a door. A series of dowels hold the rails of a door to its stiles. Typically, the dowels are spaced 1.260 inches apart in the United States standards and 32 millimeters apart in metric system countries.

Successful doweling requires precision in the sizing of the holes and dowels as well as precision in the alignment of the holes so that corresponding holes will line up correctly in the two pieces of wood to be joined. The holes must be drilled at the correct location and at the correct angle in the wood. Drilling the holes with sufficient precision by hand is practically impossible. Therefore, tools have been employed to help locate and align drills during doweling. Large and elaborate automatic machinery is available which can be programmed to precisely drill the dowel holes. However, such machinery is too expensive and/or otherwise impractical for many applications such as home workshop doweling or small scale commercial doweling operations. Smaller hand tools are also available for locating and drilling dowel holes. These tools are referred to as doweling jigs.

When using doweling jigs it is important to be able to position the jig accurately relative to locating marks made on the wood. One common way of marking two pieces of wood to be joined is to position the two pieces as they are desired to be positioned after the doweling process is completed. Then a mark is made across the surface of the two pieces to cross the interface of the two pieces of wood at the desired location of the dowel. The desired locations are chosen to give sufficient strength to the particular size and type of wood being joined. Some prior types of doweling jigs cover the marks making proper positioning of the doweling jig different without drawing subsequent marks on the surface to be drilled. Additional marking requires significantly additional time and introduces further error into the process.

A variety of different types of doweling jigs are known. To use some types of doweling jigs the width of the workpiece is measured by hand and the doweling jig is adjusted by hand to half the measured distance to center the jig on the workpiece. The drill is inserted through a guide bushing held by the jig and is guided into the workpiece at the proper angle by the bushing. The process is repeated for additional holes on the workpiece and on the mating workpiece. The disadvantage of such jigs is that the thickness of the workpiece must be measured and the jig adjusted by hand accordingly to assure that the bushings are centered on the workpiece. The measuring process is time consuming and prone to error. Inaccurate measuring results in misalignment of the two workpieces when joined or may require filling a misplaced hole and redrilling. In addition, this type of jig when attached to the workpiece blocks the operator's view of the marks on the workpiece as mentioned above.

Another type of doweling jig automatically centers the dowel holes in the wood workpiece. One known example is a hand-held doweling jig with a bushing centered between two posts. The bushing is centered over the edge of the workpiece by placing the jig upon the surface of the workpiece so that the posts extend down along the sides of the workpiece. The operator then rotates the doweling jig until the posts firmly grip the sides of the workpiece thereby centering the bushing upon the edge of the workpiece. However, this doweling jig does not allow for a plurality of dowel holes to be made with one setting and cannot be aligned with the marks on the workpiece.

Another example of an automatically centering doweling jig has two opposed vice plates with a center bar mounted in between. A threaded tightening bolt brings both plates toward the center bar at the same rate. Thus, the center bar remains centered over the edge upon tightening the plates. In this type, multiple holes may be provided through the center bar. Again, the wood marks are not visible with this type of clamp making alignment difficult. Additionally, because the bolt extends through a wide portion of the middle of the center bar, no drill guide can be located there.

In yet another exampled of a self centering doweling jig described in U.S. Pat. No. 2,810,310, two side plates are held to the sides of the wood by a clamp. The side plates are pivotally connected by a bridging bar. A hub is positioned at the center of the bridging bar between pivot points on the side plates. Thus, when the side plates are clamped to the workpiece the hub hole is centered over the workpiece. This device, too, blocks the marks on the wood and requires readjusting for each hole drilled.

There is a need in the art for doweling jig which is automatically centered upon the workpiece, enables equal spacing for a number of bushing holes and allows the user a clear view of the measuring marks on the workpiece.

SUMMARY OF THE INVENTION

The disadvantages of the prior art are alleviated to a great extent by the present invention which provides a doweling jig having two clamp rails pivotally attached to two cross-bars at positions chosen such that a parallelogram is formed when the cross-bars are pivoted to any position. A bushing holder bar is pivotally attached at its ends to the centers of the cross-bars and contains several bushing holes spaced apart from one another. Thus, when the clamp rails engage the sides of a workpiece the bushing holder bar and the drill bushings are automatically centered upon the top of the workpiece. Further, the clamp rails are open along the bottom surface of the bushing holder bar, to enable the contact between the bushing holder bar and thus the alignment marks on the workpiece to be freely visible by the user. Guidelines defining the axis of the bushing holes are inscribed on the sides of the bushing holder bar. The guidelines are lined up with the alignment marks on the workpiece to enable quick and accurate positioning of the jig.

It is an object of the present invention to provide a doweling jig.

Another object of the present invention is to provide a system for centering bushings upon a workpiece.

Yet another object of the present invention is to provide a process for manufacturing a system for centering a bushing upon a workpiece.

Yet another object of the present invention is to provide a jig for centering a plurality of equally spaced bushings upon a workpiece.

It is a further object of the invention to provide a doweling jig for automatically centering a plurality of doweling guide bushings without blocking the user's view of the alignment marks in a simple, quick and yet effective manner.

Other objects and advantages of the present invention will become readily apparent from the following description and drawings which illustrate a preferred embodiment of the present invention.

DETAILED DESCRIPTION OF A PREFERRED EMBODIMENT

Figure 1:
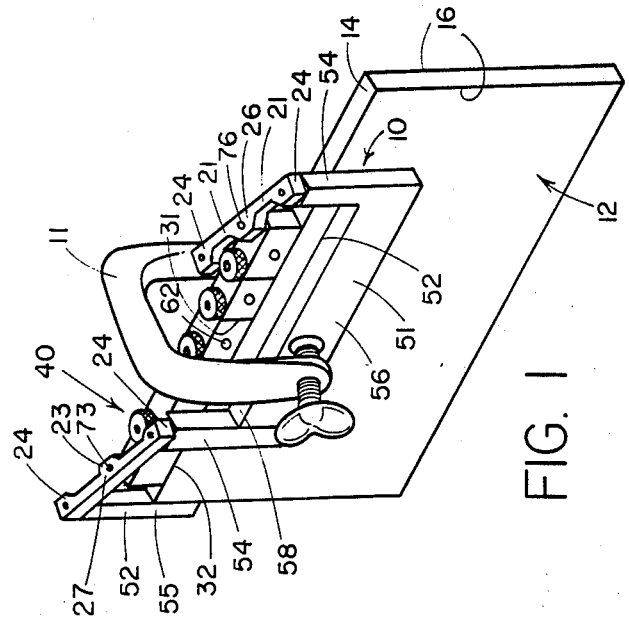
FIG. 1 is a perspective view of a preferred embodiment of the doweling jig of the present invention positioned on a workpiece.
Figure 3:
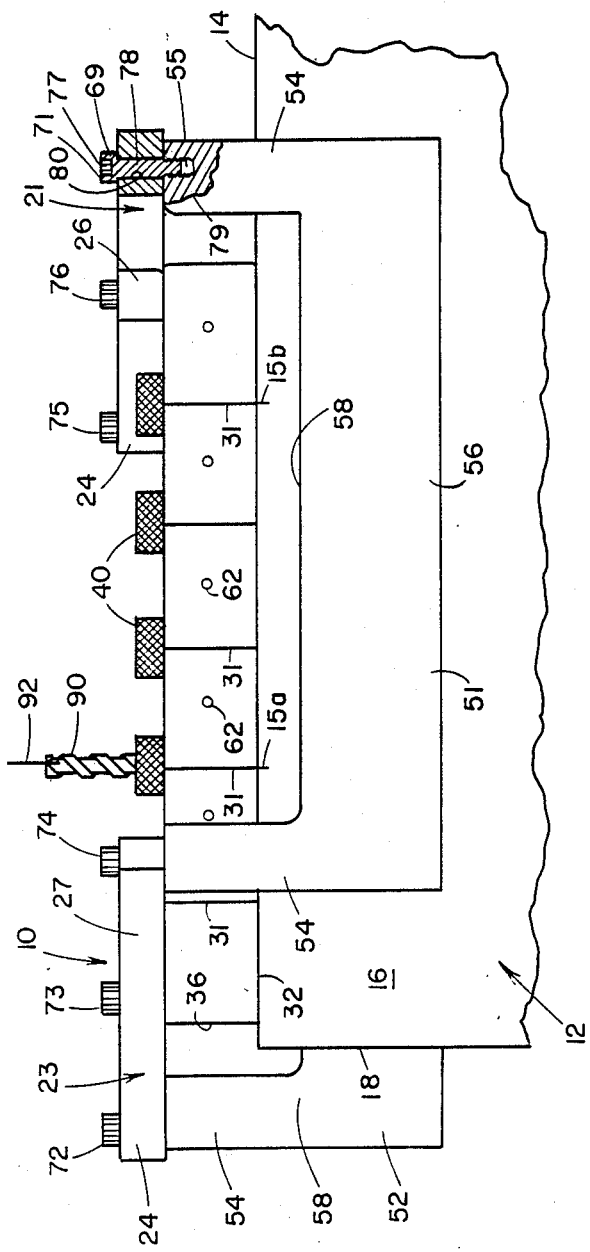
FIG. 3 is an elevational view of the doweling jig of FIG. 1.
Figure 4:
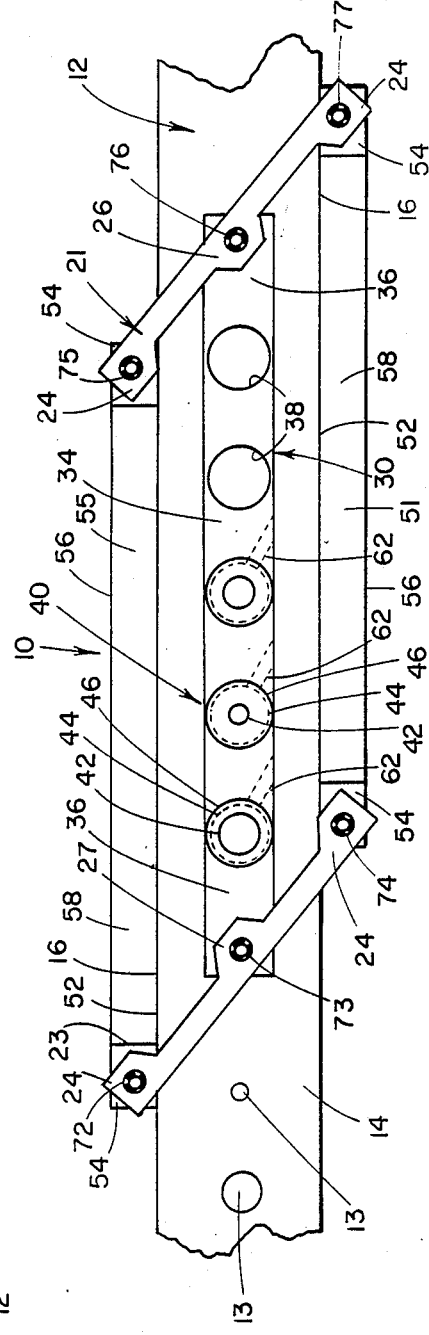
FIG. 4 is a plan view like FIG. 2 showing use of the jig on a wider workpiece.

Refer now FIG. 1 wherein is shown a preferred embodiment of a doweling jig, generally referred to by reference numeral 10, according to the present invention. In FIG. 1 the jig 10 is shown clamped by a C-clamp 11 to a workpiece 12. The jig 10 includes a first clamp rail 51, a second clamp rail 55, a first cross-bar 21 and second cross-bar 23. The clamp rails 51 and 55 are identical. Each clamp rail has a flat elongated body portion 56 that is sized in length and thickness to be clamped to the workpiece 12 to hold the jig in place during use. Each clamp rail has a pair of arms 54 extending perpendicularly from each end of the body 56 to rise above the surface 14 of the workpiece 12 that is to be drilled. As shown in FIGS. 1, 3 and 4, the cross-bars 21 and 23, which are identically constructed, are pivotally connected to the arms 54 of the clamp rails 51 and 55 such that the cross-bars 21 and 23 are positioned parallel to one another and the clamp rails 51 and 55 are parallel to one another. Thus, when the clamp rails 51 and 55 are clamped onto the workpiece 12, the clamp rails remain parallel as they pivot with respect to the cross-bars 21 and 23 which also remain parallel.

Specifically the first cross-bar 21 is pivotally connected to the first clamp rail 51 by a pivot pin 77. The pivot pin 77 may be of any suitable construction. As shown in cross-section in FIG. 3, pin 77 has an unthreaded length 78 extending through a smooth bore 80 in the cross-bar 21 and has a threaded length 79 screwed into a threaded bore 55 in the arm 54 of the clamp rail 51. Thus, the cross-bar 21 may pivot on the pin 77 which is affixed to clamp rail 51, being held to the clamp rail 51 by the head 71 of the pivot pin 77. The head 71 has a six sided socket 69 for accepting an allen wrench. The other pivot pins are similarly constructed.

Figure 6:
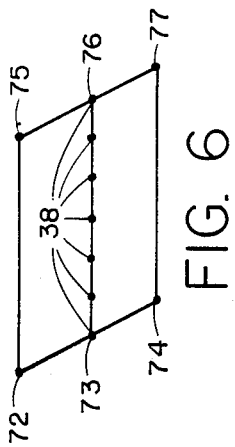
FIG. 6 is a schematic representation of the geometric features of the jig of FIG. 1.

The first clamp rail 51 is also pivotally connected to the second cross-bar 23 by the pivot pin 74. The second clamp rail 55 is pivotally connected to the first cross-bar 21 by the pivot pin 75. The second clamp rail 55 is pivotally connected to the second cross-bar 23 by the pivot pin 72. As shown in FIG. 6, the pivoting points are chosen so that lines connecting the pivot pins 72, 74, 75 and 77 form a parallelogram. The distances between the respective pivot pins of the cross-bars 21 and 23 are of equal length and on opposite sides of the parallelogram and the distances between the respective pivot pins of clamp rails 51 and 55 are of equal length and on opposite sides of the parallelogram. A bushing holder bar 30 is pivotally connected to the midpoints of the cross-bars 21 and 23. Specifically, as shown in FIGS. 1, 3 and 4, the bar 30 is pivotally connected to the midpoint 26 of the first cross-bar 21 by a pivot pin 76 and the bar 30 is pivotally connected to the midpoint 27 of the second cross-bar 23 by a pivot pin 73. Thus when the inner surfaces 52 of the clamp rails 51 and 55 are clamped to the sides 16 of the workpiece 12, the bushing holder bar 30 is automatically centered upon the upper edge 14 of the workpiece 12 and the bottom surface 32 of the bushing holder bar 30 resides atop the upper edge 14 of the workpiece 12.

Figure 2:
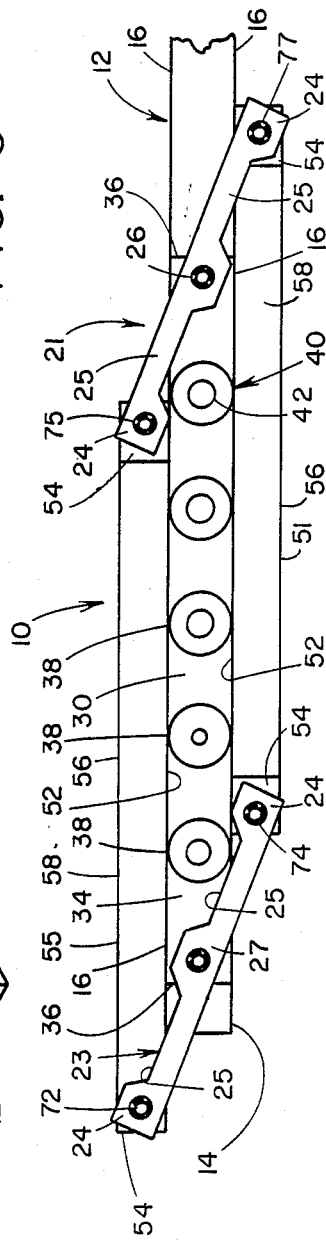
FIG. 2 is a plan view of the doweling jig of FIG. 1.

Referring now to FIG. 2, the bushing holder bar 30 has a plurality of bushing holes 38 (See also FIG. 4) formed through its thickness and spaced along the length of the bar 30 at equal distances. In the preferred embodiment shown, the bar 30 has fiVe holes 38 and the distance between the center of the holes 38 is 1.260 inches, which is an industry standard in the United States for the distance between dowel holes in doors and other applications. Other standard dowel separation distances exist for other countries and products. For example, thirty-two millimeters is the industry standard for doors in metric system countries. The number of holes 38 and the distance between them may vary in different embodiments of the invention. In FIG. 2, a bushing 40 is shown positioned in each of the holes 38 Each bushing 40 has an inner diameter 42. Different bushings 40 with different inner diameters 42 may be used with the jig 10 so as to accommodate different size drills, as described more fully below. When drilling a series of dowel holes having the same diameter, such as for assembly of a door, each bushing 40 will have the same inner diameter 42. FIGS. 2 and 4 show the use of various different inner diameters 42.

In the preferred embodiment shown, the cross-bars 21 and 23 are sized to separate the inside surfaces 52 of the clamp rails by a maximum of three inches when the cross-bars are perpendicular to the clamp rails. The bushing bar 30 is eleven sixteenths of an inch wide. Thus, the thinnest workpiece 12 with which the jig 10 can be used is also eleven sixteenths inch wide. Grooves 25 are formed into of the cross-bars 21 and 23 so that the cross-bars 21 and 23 will not be blocked by the bushing 40 when the cross bars 21 and 23 are pivoted to their maximum extent to enable accommodation of the thinnest workpiece 12 suitable for the jig. The thickest workpiece with which the jig 10 can be used is three inches which is the maximum distance between the inside surfaces 52 of the clamp rails 51 and 55. By employing longer cross-bars 21 and 23, thicker workpieces may be accommodated. Also by using a thinner bar 30, narrower workpieces can be accommodated. In addition, by substituting a thicker bushing holder bar 30, larger bushing holes 38 are possible which enable the device to be used with larger bushings 40 with larger inner diameters 42. Thus, the invention, through simple modifications, can be used to dowel a variety of different sized doweling holes in a number of sized workpieces.

Referring now to FIG. 3, the guidelines 31 on the bushing holder bar 30 are aligned with the centers of the bushing holes 38 and also with the centers of the bushing inner diameters 42 and the drill 90 and drill axis 92. To align the drill axis 92 with the alignment marks on the workpiece 12, such as marks 15a and 15b, the jig is moved until the appropriate guideline 31 corresponds to the alignment mark. Because the upper sides 58 of the clamp rails 51 and 55 are positioned below the bottom surface 32 of the bushing holder bar 30, the operator has a clear view of the guidelines 31 and the marks 15a and 15b. Thus the operator can quickly, easily and accurately center the bushing holes 38 upon marked positions on the workpiece 12. The bushings 40 are provided with heads 48 with gripping surfaces so that they can be firmly grasped for removal from and entry into the bushing holes 38. For each bushing 40 a threaded bore 62 is provided extending from the surface 35 of the bar 30 to the hole 38. A locking bolt 64 is positioned in each threaded bore 62 for securing the bushing 40 to the bushing holder bar 30, as described more fully below. The ends 54 of the clamp rails 51 and 55 may extend past the end 18 of the workpiece 12.

It should be noted, that because of the length of the jig 10 and its clamp rails 51 and 55, the jig 10 may be clamped to the workpiece 12 to drill a dowel hole near or at the edge 18 of the workpiece 12. In addition the guideline 31 nearest the end 36 of the bar 30 in FIG. 3 is always visible to the user because the length of the cross-bar 23, the distance between the pivot pins 73 and 74 and the width of the arm 54 are chosen such that the arm 54 lies to the side of and not over guidelines 31 when the arm 54 is touching the bar 30.

Referring now to FIG. 4, three bushings 40 are shown positioned in three bushing holes 38. The three bushings 40 each have a different inner diameter 42 which may accommodate different diameter drills. Through use of bushings 40 with different inner diameters 42, equally spaced doweling holes 13 with different sizes are possible. Although the inner diameter 42 may differ between bushings 40, the outer diameters 44 of the bodies of bushings 40 do not differ between bushings 40 and are sized to snugly fit into the bushing holes 38. The length of the body is chosen to be essentially the same as the thickness of the bar 30. The outer diameters 46 of the heads 48 of the bushings 40 are also of a uniform size, larger than the outer diameters 44, so as to preclude the bushings 40 from extending too far into the holes 38. The heads 48 may be provided with hatched grooves so as to facilitate gripping by the user. The threaded bore 62 is cut at a diagonal to bushing holder bar 30 to provide sufficient length to accommodate the entire length of the bolt 64 within the bar 30. The bolt 64 is provided with a hex-head 66 for accepting an allen wrench which may be inserted into the bore 62 for loosening and tightening the bolt 64 to release or lock the bushing 40 into place. The bore 62 has a wide non-threaded portion 63 at its outlet to allow for easier initial threading of the bolt 64 and to eliminate the danger of scratches to the user from an exposed threaded surface.

Figure 5:
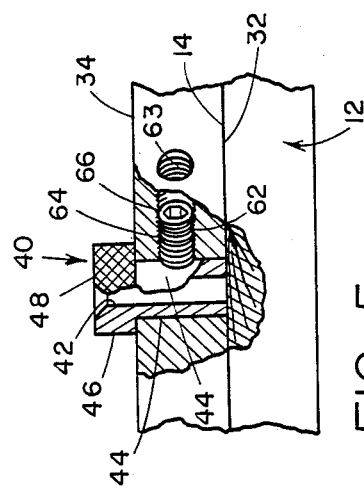
FIG. 5 is a partial cutaway side view of the bushing holder of the doweling jig of FIG. 1.

Referring now to FIG. 5, locking bolt 64 is disposed in threaded bore 62 and bears screw slot 66 on its face so that when a wrench (not shown) is inserted into bore 62 and comes into contact with slot 66, rotation of the wrench also rotates bolt 64 so that it moves into or out of the slot, depending upon the direction of rotation. The locking bolt 64 can be brought into contact with the intermediate diameter surface 44 of the bushing 40 thus firmly engaging the bushing to bushing hole 38. In a similar fashion the bolt 64 can be moved away from bushing 40, allowing the bushing 40 to be removed from bushing hole 38.

Refer now to FIG. 6, there being shown a schematic representation of the geometry of the jig 10. The location of the pivot pins 72, 74, 75 and 77 form a parallelogram. A straight line extending between the locations of pivot pins 73 and 76 is always parallel and half way between the straight lines defined by the pivot pins 72 and 75 on the one hand and the pivot pins 74 and 77 on the other hand. The centers of the dowel locating holes 38 on the bar 30 lie along the 73—76 line. Therefore, upon clamping the clamp rails 51 and 55 to the WOrkpiece 12, the centers of the locating holes 38 are automatically centered on the workpiece.

The jig 10 facilitates the task of drilling a number of equally spaced holes 13 in a Workpiece 12. After the location of the first dowel hole is marked on the side 16 of the workpiece 12, the jig 10 is positioned on the workpiece and moved until the guideline 31 at one end is lined up with the mark 15. The jig is then clamped into place. With the first positioning of jig 10, five holes 13 are drilled, one hole 13 for each bushing 40. The user then repositions the jig 10 such that a bushing 40 is over the last hole 13 drilled and inserts a dowel or bit through the bushing 40 and into the hole 13. The bar 30 is then positioned for drilling four new holes 13. The process can be repeated as many times as necessary, with four new holes 13 as many times as necessary, with four new holes 13 being drilled with each new positioning.

The above description and drawings are only illustrative of a preferred embodiment which achieves the objects, features and advantages of the present invention, and it is not intended that the present invention be limited thereto Any modifications of the present invention which comes within the spirit and scope of the following claims is considered part of the present invention.

What is claimed and desired to be protected by Letters Patent of the United States is:

1. A doweling jig comprising: at least two cross bars pivotally engaged at their ends to the ends of at least two clamp rails such that said cross bars and clamp rails generally define a parallelogram when said cross bars are pivoted with respect to said clamp rails; and a bushing holder bar including at least one bushing hole for housing a bushing, said bushing having a sufficient length for guiding a drill and said bushing holding bar being pivotally engaged at tow pivot locations to the centers of said cross bars such that when said clamp rails engage the outer surfaces of a workpiece said bushing holder bar is thereby automatically centered on said workpiece, said clamp rails residing substantially below the plane defined by the bottom surface of said bushing holder bar such that the positioning of said bushing hole with respect to said workpiece may be readily observed by the operator.

2. A jig as in claim 1 wherein the sides of said bushing holding bar bear a mark defining the longitudinal axis of each said bushing hole such that the positions of each said bushing hole with respect to said workpiece may be readily observed by the operator.

3. A jig as in claim 1 wherein the outer surfaces of said clamp rails are generally flat so as to facilitate clamping of said clamp rails against said workpiece.

4. A doweling jig comprising: at least two cross bars pivotally engaged at their ends to the ends of at least two clamp rails such that said cross bars and clamp rails generally define a parallelogram when said cross bars are pivoted with respect to said clamp rails; and a bushing holder bar including at least one bushing hole for housing a bushing, said bushing having a sufficient length for guiding a drill and said bushing holding bar being pivotally engaged at two pivot locations to the centers of said cross bars such that when said clamp rails engage the outer surfaces of a workpiece said bushing holder bar is thereby automatically centered on said workpiece, a bushing being releasably secured in each said bushing hole by a fastening means, said fastening means including a locking bolt positioned within a threaded bore which runs at a diagonal angle from the outer surface of said bushing holder bar to the outer surface of said bushing such that, by rotation, said locking bolt may snugly engage and disengage said bushing.

5. A jig as in claim 4 wherein said rotation means comprises a wrench inserted into said threaded bore and in engagement with said locking bolt.

6. A jig as in claim 4 wherein said bushing holder bar comprises a plurality of bushing holes wherein each said bushing hole is spaced an equal distance apart from the neighboring said drill bushing holes.

7. A jig as in claim 6 wherein each said bushing hole has an equal diameter.

8. A jig as in claim 7 wherein each said bushing has an intermediate diameter generally equal to each said diameter of each said bushing hole.

9. A jig as in claim 8 wherein the inner diameters of said bushings vary.

10. A jig as in claim 6, wherein said distance is 1.260 inches.

11. A jig as in claim 6, wherein said distance is 32 millimeters.

12. A doweling jig for locating a drill for drilling holes in a workpiece having two opposite sides and an edge between the sides, comprising:
   a. clamp means for clamping the jig to the workpiece wherein said clamp means includes two clamp rails such that when the inner surfaces of said clamp rails are clamped to the sides of said workpiece, said clamp rails reside substantially below the plane defined by the upper surface of said workpiece thereby giving the operator an unencumbered view of the interface between the jig and the workpiece;
   b. guide means for guiding a drill through said jig into said workpiece wherein said guide means includes a bushing holder bar with a plurality of bushing holes, each hole capable of housing interchangeable bushings with different inner diameters wherein said bushings have a bore with a length which is greater than its diameter;
   c. alignment means for aligning said guide means with marks on one of the sides of said workpiece wherein said alignment means includes guidelines marked on the sides of said bushing holder bar to define the longitudinal axis of each said bushing hole such that the position of each said bushing hole with respect to said workpiece may readily be observed by the operator;
   d. centering means for automatically centering said guide means on said workpiece wherein said centering means includes two cross bars pivotally engaged at their ends to the ends of said two clamp rails such that said cross bars and clamp rails define a parallelogram when said cross bars are pivoted with respect to said clamp rails and said bushing holder bar is pivotally engaged at two pivot locations to the centers of said cross bars such that when said clamp rails engage the outer surfaces of said workpiece, said bushing holder bar is thereby automatically centered on said workpiece; and
   e. spacing means for equally spacing a plurality of said guide means of the same diameter along said workpiece wherein said spacing means includes a plurality of bushing holes being of the same diameter and being spaced 1.260 inches apart along said bushing holder bar and said bushings being interchangeable by locking bolts which reside within the threaded bores which run at a diagonal from the surface of said bushing holder bar to said bushing hole.

13. A doweling jig comprising: at least two cross bars pivotally engaged at their ends to the ends of at least two clamp rails such that aid cross bars and clamp rails generally define a parallelogram when said cross bars are pivoted with respect to said clamp rails; and a bushing holder bar including at least one bushing hole for housing a bushing, said bushing having a sufficient length for guiding a drill and said bushing holding bar being pivotally engaged at two pivot locations to the centers of said cross bars such that when said clamp rails engage the outer surfaces of a workpiece said bushing holder bar is thereby automatically centered on said workpiece, and said bushing holder bar contacts said workpiece.

14. A system for centering at least one bushing on a workpiece comprising:
   a. at least two cross bars pivotally engaged at their ends to the ends of at least two clamp rails such that said cross bars and clamp rails generally define a parallelogram when said cross bars are pivoted with respect to said clamp rails; and
   b. a drill bushing holder bar comprising at least one bushing hole for housing said bushing, said bushing having a length which is greater than the diameter of the hole and said bushing holding bar being pivotally engaged at both ends to the centers of said cross bars, such that when said clamp rails engage the outer surfaces of said workpiece, said bushing holder bar is thereby automatically centered on said workpiece, and said bushing holding contacts said workpiece.

15. A method for drilling a dowel hole comprising the steps of:
   a. providing at least two cross bars and at least two clamp rails and pivotally engaging the ends of said cross bars to the end of said claim rails such that said cross bars and clamp rails generally define a parallelogram when said cross bars are pivoted with respect to said clamp rails;
   b. providing a bushing holder bar comprising at least one bushing hole for housing said bushing, said bushing having a length greater than its diameter and pivotally engaging said bushing holder bar at both ends to the centers of said cross bars such that when said clamp rails engage the outer surfaces of a workpiece, said bushing holder bar is thereby automatically centered on and contacts said workpieces; and c. drilling a dowel hole with a drill positioned within the bushing hole.

16. A doweling jig comprising: at least two cross bars pivotally engaged at their ends to the ends of at least two clamp rails such that said cross bars and clamp rails generally define a parallelogram when said cross bars are pivoted with respect to said clamp rails; and a bushing holder bar including at least one bushing hole for housing a bushing, said bushing having a sufficient length for guiding a drill and said bushing holding bar being pivotally engaged at two pivot locations to the centers of said cross bars such that when said clamp rails engage the outer surface of a workpiece said bushing holder bar is thereby automatically centered on said workpiece, and said bushing contacts said workpiece.

* * * * *